United States Patent [19]

Nosler

[11] 4,269,512
[45] May 26, 1981

[54] ELECTRO-OPTICAL POSITION-MONITORING APPARATUS WITH TRACKING DETECTOR

[76] Inventor: John C. Nosler, 2587 Floral Hill Dr., Eugene, Oreg. 97403

[21] Appl. No.: 13,740

[22] Filed: Feb. 21, 1979

[51] Int. Cl.$^3$ .................... G01B 11/14; G01N 21/86
[52] U.S. Cl. .................................. 356/375; 250/561; 250/204
[58] Field of Search ............... 356/398, 376, 387, 375; 250/203, 204, 560, 561; 350/96.24

[56] References Cited

U.S. PATENT DOCUMENTS

| | | | |
|---|---|---|---|
| 3,589,815 | 6/1971 | Hosterman | 356/376 |
| 3,806,253 | 4/1974 | Denton | 356/376 |
| 4,037,958 | 7/1977 | Schmidt et al. | 356/398 |
| 4,125,314 | 11/1978 | Haskell et al. | 350/96.24 |

OTHER PUBLICATIONS

Cranberg, Sensory Aid for the Blind, "Electronics", 3/46, pp. 116-119.

Primary Examiner—Vincent P. McGraw
Assistant Examiner—Rodney Bovernick
Attorney, Agent, or Firm—Kolisch, Hartwell & Dickinson

[57] ABSTRACT

An electro-optical position-monitoring system including a tracking detector whose position is interpretable to indicate the spatial location of a monitored object. In one embodiment, the detector includes a beam-splitting prism, and in the other includes two arrays of fiber-optic elements—both arrangements being designed to divide reflected, received light into two optical paths. Interposed in these paths are photodetectors which each produce an output signal directly indicative of the intensity of light received along the associated path. Circuitry which responds to such signals effects tracking movement of the prism (or the arrays) so as to equalize signals produced by the photodetectors. When equalization occurs, tracking stops, and the repositioned location of tracked parts is directly readable as an indication of the spatial location of the monitored object.

4 Claims, 2 Drawing Figures

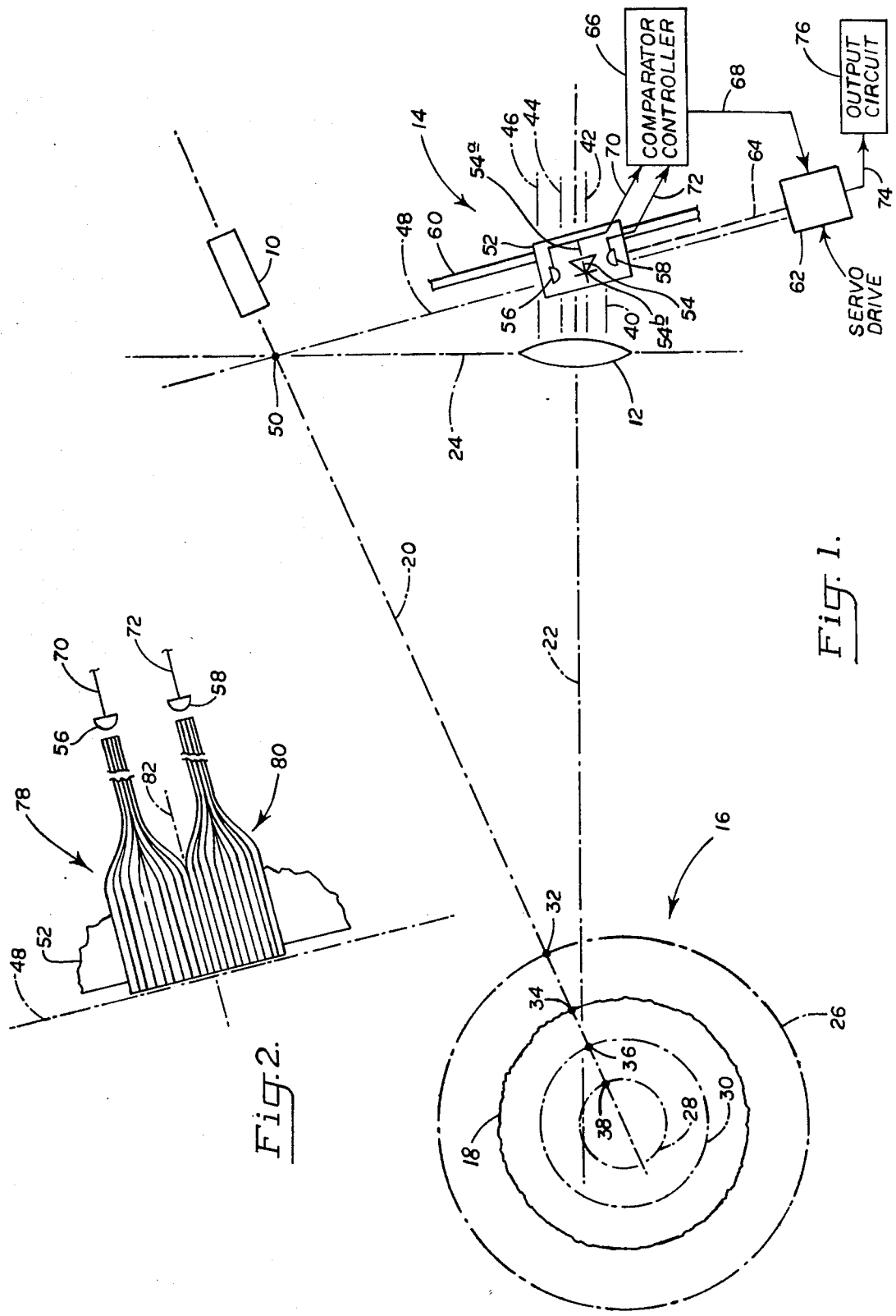

ELECTRO-OPTICAL POSITION-MONITORING APPARATUS WITH TRACKING DETECTOR

BACKGROUND AND SUMMARY OF THE INVENTION

This invention pertains to an electro-optical object-position-monitoring system, and more particularly to such a system which utilizes a tracking detector whose "rest" position, following tracking, is readable as an indication of the spatial location of the surface of a monitored object.

There are many instances, such as for example in a plywood mill, where it is desired to make an accurate measurement of the distance between a known location and a particular object, so as to locate the object (or more particularly the object's near surface) as precisely as possible in space. A preferred embodiment of the present invention is described herein in conjunction with a block-centering operation, wherein it is important to be able to position a log in a closely controlled position relative to a veneer peeler blade.

According to this embodiment a small-diameter laser beam is projected along one axis toward what might be thought of as a viewing zone, in which logs are expected to appear prior to a block-centering operation. "Looking," so-to-speak, along another and intersecting axis are a lens, and an optically sensitive receptor which looks for light from this beam which is reflected from a log's surface.

When the laser beam strikes the surface of a log, the lens focuses toward the receptor an image of the reflected light. The position of the center of such an image is directly interpretable to indicate the distance to the impinged log surface.

Employed as a receptor in one embodiment of the invention is a beam-splitting prism which divides light that it receives into two optical paths which extend toward two different photodetectors. The prism and photodetectors are mounted on a carriage which is movable back and forth along a predetermined path under the influence of a servo-drive device. The photodetectors are connected to two inputs in a comparator circuit which produces a DC output signal whenever the amount of light received by the two photodetectors differs. The polarity of this signal indicates which of the two photodetectors is receiving the greater amount of light. When the amount of light received by the two photodetectors is equal, no output signal is generated.

The output signal produced by the comparator circuit is fed to the servo-drive which responds by driving the carriage so as to shift the prism and photodetectors toward a location where illumination on the two photodetectors is equal. The condition of the servo-drive, with the carriage at rest, is monitored by a conventional rotary shaft encoder and output circuit which produces an output voltage whose magnitude is directly interpretable to indicate the position of the carriage. According to an alternate embodiment of the invention, the prism is replaced by two side-by-side disposed arrays of fiber-optic elements. The elements in each such array, at one end of the array, are splayed so as to place the elements' ends side-by-side in a row. From this end of the array, and progressing toward the other end, the elements merge into a bundle, the opposite end of which is aimed toward a photodetector. The splayed ends of the arrays are mounted for movement on a carriage like that mentioned above. The output terminals of the photodetectors connect as earlier mentioned to the inputs in a comparator circuit, and the remaining structure in this embodiment is duplicative of that contained in the first-outlined embodiment. Here also a servo-drive functions to shift the carriage to a position wherein the amount of light directed onto the two photodetectors is equal. The condition of the servo-drive, under such a circumstance, is readable as an indication of the position of the point of adjacency of the element ends in the two side-by-side arrays.

In both of the embodiments just generally outlined, positioning of the carriage to produce equal light reception by the two photodetectors causes, in the case of the prism, the front edge thereof, and in the case of the fiber-optic arrays, the junction therebetween, to reside substantially centrally on the spot of reflected light imaged by the lens. Accordingly, the "at rest" position of the carriage is interpretable to indicate the spatial location of the surface of a monitored log.

One of the important advantages offered by each of these modifications is simplicity, coupled with a high degree of accuracy.

These and various other objects and advantages which are attained by the invention will become more fully apparent as the description which now follows is read in conjunction with the accompanying drawing.

DESCRIPTION OF THE DRAWINGS

FIG. 1 illustrates, in schematic form, an embodiment of the invention utilizing a beam-splitting prism. The drawing is not prepared to scale.

FIG. 2 is also a schematic view, on a considerably larger scale than FIG. 1, illustrating a portion of another embodiment of the invention which utilizes a pair of arrays of fiber-optic elements.

DETAILED DESCRIPTION OF THE INVENTION

Turning now to the drawings, and referring first to FIG. 1, what is shown herein is a side schematic view illustrating the components of one embodiment of position-monitoring apparatus as contemplated herein. Included within this apparatus are a laser 10, also referred to as a light source, a lens 12, also referred to as an imaging means, and a receptor, or receptor means, 14. The laser and lens are each conventional in construction, and are commercially available. The receptor is specially constructed, as will be explained below.

Indicated generally at 16 is what might be thought of as a viewing zone in which the apparatus is intended to monitor the positions of the near sides of logs on the feed side of a veneer peeler. A log within this zone is shown (end view) at 18.

Laser 10 is positioned and oriented to project a small-diameter beam (typically about 1.5-millimeters) along a projection axis shown at 20. Axis 20 extends into zone 16, and occupies the plane of the drawing.

Lens 12 is positioned and oriented to view zone 16 generally along a central viewing axis shown at 22. Axis 22 intersects axis 20, and also lies in the plane of the drawing. Lens 12 herein is a circular, double-convex lens which lies in a plane 24 that is normal both to the plane of the drawing, and to axis 22.

The apparatus of the invention is designed to offer a dynamic viewing range suited to the particular setting in which it is employed. In the specific example now being described, such apparatus is used to locate the near surfaces of logs whose diameters lie within the range of about 8-inches to about 48-inches. Logs presented in viewing zone 16 will, through conventional log-handling apparatus which is in no way involved with the present invention, normally be placed in zone 16 with their approximate central axes always closely aligned with a predetermined axis that extends (at a known location) through the viewing zone (substantially normal to the plane of the drawing). Thus, with logs having such a range of expected diameters, the required dynamic range for the illustrated system is about 20-inches.

Referring to the left side of the drawing, circular line 26 represents one "end" of the selected dynamic range, and line 28 represents the other "end". More specifically, a log having a diameter of about 48-inches would, as viewed in the drawing, have its outside generally coincident with line 26. On the other hand, an 8-inch diameter log similarly viewed would have its outside generally coincident with line 28. Line 30 represents a log having a diameter of about 24-inches. Log 18 has a diameter of about 38-inches.

Still with reference to the left side of the drawing, it can be seen that axis 20 intersects line 26 at a point 32, intersects the near surface of log 18 at a point 34, intersects line 30 at a point 36, and intersects line 28 at a point 38. These points are, of course, merely representative of the infinite number of points, between points 32, 38, where the beam from laser 10 could intersect, or impinge, the side of a log in zone 16.

With respect to the four particular points just mentioned, and considering the operation of lens 12, the lens, on its right side, images a beam-impingement occurring at point 32 along a line 40, images an impingement at point 34 with log 18 along a line 42, images an impingement at point 36 along a line 44, and images an impingement at point 38 along a line 46. Lines 40, 42, 44, 46 all lie in the plane of the drawing.

The exact angle which is used between axes 20, 22 is a matter of choice, and depends upon the specific application in which the apparatus is to be used. Generally speaking, the greater this angle, the smaller the dynamic range and the greater the optical resolution. Conversely, the smaller the angle, the greater the dynamic range and the poorer the optical resolution. In the particular application now being described, wherein the dynamic range is about 20-inches, the angle between these axes is about 14.5°.

Another factor which is a matter of choice, and which depends upon the particular application for the apparatus, is the distance of the apparatus from the viewing zone. In the particular apparatus illustrated herein, lens 12 is located about 60-inches from previously mentioned point 38.

As is discussed in my copending U.S. application Ser. No. 973,227, filed Dec. 26, 1978, for "Electro-Optical Distance-Measuring System", reflected images produced by lens 12 are all in sharp focus along a line 48 which intersects axis 20 at the same point (50) where axis 20 is intersected by the plane (24) containing lens 12.

Continuing now with a description of receptor 14, included therein are a carriage 52, a beam-splitting prism 54 and a pair of photodiodes 56, 58. Carriage 52 is mounted for movement back and forth along a straight track 60 which is suitably mounted in place in the system. The carriage and track may be made to have any one of a wide number of configurations well within the ability of those skilled in the art. The longitudinal axis of track 60 is substantially parallel to previously mentioned line 48.

Prism 54 is suitably mounted on the carriage with its central axis 54a normal to the path along which the carriage moves. The prism's leading edge, 54b, points toward lens 12, and lies on line 48.

When impinged with light, the prism splits the incident light into two beams which are directed along oppositely disposed optical paths which substantially parallel line 48. Photodiodes 56, 58 are interposed in these paths, and are also suitably mounted on carriage 52. As shown in FIG. 1, photodiode 56 is located above the prism, and photodiode 58 below the prism.

Provided for reversibly moving carriage 52 is a conventional servo-drive 62—the same being suitably drivingly connected to the carriage as indicated by dashed line 64. The servo-drive includes a rotary motor operable under the control of a changeable DC input voltage of either polarity, and such voltage is applied to the servo-drive from what is designated as a comparator controller circuit 66 via a connection 68. Circuit 66 is conventional in construction, and includes a pair of inputs each connected to a different one of photodiodes 56, 58 through a pair of connections 70, 72, respectively.

The motor in servo-drive 62 drives a conventional shaft encoder for indicating the rotary position of the motor's shaft. The output signal (DC) produced by this encoder is coupled to an output terminal for the servo-drive. This signal indicates the number of revolutions, and in which direction with respect to a nominal position, the motor has at any time made. Such output is connected via a connection 74 to the input of what is designated as an output circuit 76. Output circuit 76 produces an output signal, or output response, indicative of servo-drive condition. This signal also is directly interpretable to indicate the position of carriage 52 along track 60.

Explaining how the apparatus just described performs, when a log is placed in viewing zone 16, light from the laser is reflected from the near side thereof toward lens 12. The lens then produces an image of the reflection along a line, such as lines 40, 42, 44, 46, whose exact position depends upon the diameter of the log. As will be evident from the discussion which took place earlier herein, the smaller the log diameter the higher the line along which this image is formed (as viewed in FIG. 1).

Regardless of where this image is formed, some light therefrom will strike and be split by prism 54 which will direct the split light along the two paths mentioned earlier toward photodiodes 56, 58. If more light is directed toward photodiode 56—indicative that the image formed by lens 12 is above prism edge 54b, the output signal produced by this photodiode will exceed that produced by photodiode 58. Comparator 66 compares these two output voltages, and under the circumstance now being described produces a positive output voltage which, when applied to servo-drive 62, causes the drive to shift carriage 52 upwardly. With upward movement of the carriage, the amount of light striking of photodiodes 56, 58 tends progressively to equalize, and this situation results in the positive output voltage produced by controller 66 progressively decreasing. Such, in turn, slows down the servo-drive while the same continues to shift the carriage upwardly along track 60.

When the carriage has been shifted to a position substantially with prism edge 54b centered on the image, incident light on photodiodes 56, 58 is substantially the same—resulting in the output voltages produced by these diodes being substantially the same. In this situation, controller 66 produces a zero-potential voltage which is applied to servo-drive 62, and the drive comes to rest.

With the drive at rest, output circuit 76 takes a reading of the voltage level then output to it from the shaft encoder included in the servo-drive, and this is, of course, indicative of prism and carriage positions. Accordingly, such a reading is also directly indicative of the position of the impinged point on the log which is placed in the viewing station.

A situation is illustrated in FIG. 1 where the carriage and prism are at rest in a position with edge 54b centered on the image produced along line 42 from laser impingement point 34 with log 18.

Directing attention now to FIG. 2 which illustrates a modified form of the invention, here, prism 54 is replaced by a pair of elongated arrays of fiber-optic elements shown generally at 78, 80. These are conventional elements which normally are arranged in bundles, and the right ends of these arrays are so-arranged and are aimed at photodiodes 56, 58. In this embodiment of the invention, these two photodiodes are not mounted on carriage 52. The left ends of the elements in the two arrays are spread out into what might be thought of as side-by-side contiguous adjacency and are aligned substantially along previously mentioned line 48. The combination of array 78, 80 is arranged symmetrically on opposite sides of what might be thought of as a central axis, for the combination, such being shown by dash-dot line 82 which line is substantially normal to line 48. All of the elements at the left end of array 78 are disposed above line 82 and are suitably anchored to carriage 52, and the left ends of all of the elements in array 80 are arranged below line 82 and similarly anchored to the carriage.

The modification shown in FIG. 2 functions in much the same manner as that shown in FIG. 1. More specifically, when a laser beam impingement is imaged by lens 12, it strikes the left ends of the fiber-optic elements, and is transmitted thereby along the two optical paths defined by the right ends of the elements which aim toward photodiodes 56, 58. Signals produced by these photodiodes are monitored for a difference, and comparator 66 produces a control output signal for servo-drive 62 which tends to shift the carriage toward a position equalizing light impingement on photodiodes 56, 58. When equalization has been achieved, the carriage is brought to a rest and the shaft encoder output in the servo-drive is read as earlier described by output circuit 76.

While two embodiments of the invention have been described herein, it will be appreciated by those skilled in the art how variations and modifications may be made without departing from the spirit of the invention.

It is claimed and desired to secure by letters patent:

1. In an electro-optical object-position-monitoring system including a beam-projecting non-traveling light source, and imaging means for collecting and transmitting light from said source which is reflected by a monitored object, receptor means positioned to receive reflected light transmitted by said imaging means, operable to produce an output response interpretable to indicate monitored object position, said receptor means comprising a carriage mounted adjacent said imaging means for reversible movement along a path generally transverse to the transmission axis of said imaging means, a receiver mounted on said carriage disposed to receive light transmitted by said imaging means, and operable to divide such light for transmission along two different optical paths, with the amount of light transmitted along each path dependent on the position of said receiver relative to light transmitted by said imaging means, photodetector means for each path, each responsive to light transmitted therealong to produce a signal reflective of the intensity of light received by the photodetector means, and means operatively interposed between said photodetector means and said carriage, operable in response to signals produced by the former to effect movement of the latter so as to equalize such signals, said path being oriented whereby, at all positions of said carriage therealong, and under circumstances wherein an image of reflected light causes said two photodetectors to produce equal signals, such image is in focus on said receiver.

2. The system of claim 1 which further includes means operatively responsive to the position of said carriage to produce said output response.

3. The system of claim 1, wherein said receiver comprises a beam-splitting prism.

4. The system of claim 1, wherein said receiver comprises two arrays of elongated fiber-optic elements, with the elements in each array having one set of ends disposed in side-by-side linear adjacency, and linearly contiguous with the corresponding ends in the other array.

* * * * *